(12) United States Patent
Stabenow et al.

(10) Patent No.: US 11,697,318 B2
(45) Date of Patent: Jul. 11, 2023

(54) THROTTLE ASSEMBLY AND PRESSURE CONTROL SYSTEM HAVING SUCH A THROTTLE ASSEMBLY

(71) Applicant: WABCO GmbH, Hannover (DE)

(72) Inventors: Uwe Stabenow, Laatzen (DE); Joerg Scharpenberg, Burgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 853 days.

(21) Appl. No.: 16/607,107

(22) PCT Filed: Apr. 11, 2018

(86) PCT No.: PCT/EP2018/059279
§ 371 (c)(1),
(2) Date: Oct. 22, 2019

(87) PCT Pub. No.: WO2018/202392
PCT Pub. Date: Nov. 8, 2018

(65) Prior Publication Data
US 2020/0376914 A1    Dec. 3, 2020

(30) Foreign Application Priority Data

May 5, 2017  (DE) ..................... 10 2017 004 414.7

(51) Int. Cl.
*B60G 17/052*   (2006.01)
*B60G 17/015*   (2006.01)
(Continued)

(52) U.S. Cl.
CPC ..... *B60G 17/0528* (2013.01); *B60G 17/0155* (2013.01); *B60G 17/0523* (2013.01);
(Continued)

(58) Field of Classification Search
CPC ........... B60G 17/0528; B60G 17/0155; B60G 17/0523; B60G 2500/205; F15B 2211/25;
(Continued)

(56) References Cited

U.S. PATENT DOCUMENTS 4,335,867 A   6/1982   Bihlmaier
8,876,122 B2  11/2014  Gall
(Continued)

FOREIGN PATENT DOCUMENTS

DE    1119453 B    12/1961
DE    2056635 C3   12/1975
(Continued)

*Primary Examiner* — Atif H Chaudry
(74) *Attorney, Agent, or Firm* — Leydig, Voit & Mayer, Ltd.

(57) ABSTRACT

A throttle assembly for a pressure control system in a vehicle includes at least one throttle valve. The at least one throttle valve defines an assembly cross-section of the throttle assembly, the assembly cross-section specifies a flow resistance acting on a pressure medium entering the throttle assembly, and the at least one throttle valve includes at least one controllable throttle valve configured to be controlled in accordance with an upstream pressure. The assembly cross-section of the throttle assembly is configured to be set, by control of the at least one controllable throttle valve, in such a way that an inlet volume flow of the pressure medium entering the throttle assembly can be limited to a limit volume flow in accordance with the upstream pressure, in order to set, in accordance with the upstream pressure, a power consumption of a pneumatic load in the pressure control system.

18 Claims, 8 Drawing Sheets

(51) Int. Cl.
*F04D 25/04* (2006.01)
*F04D 27/02* (2006.01)
*F04B 49/22* (2006.01)

(52) U.S. Cl.
CPC ............ *F04B 49/225* (2013.01); *F04D 25/04* (2013.01); *F04D 27/0253* (2013.01); *B60G 2202/152* (2013.01); *B60G 2500/204* (2013.01); *B60G 2500/205* (2013.01)

(58) Field of Classification Search
CPC .. F15B 2211/428; F15B 21/048; F04B 49/08; F04B 49/225; F04D 27/0253
See application file for complete search history.

(56) References Cited

U.S. PATENT DOCUMENTS

| | | | |
|---|---|---|---|
| 9,273,700 | B2 | 3/2016 | Bergemann et al. |
| 9,829,248 | B2 | 11/2017 | Folchert et al. |
| 9,926,994 | B2 | 3/2018 | Frank et al. |
| 2004/0228737 | A1 | 11/2004 | Folchert |
| 2010/0036576 | A1* | 2/2010 | Diekmeyer ............. B60T 17/02 303/9.66 |
| 2014/0241859 | A1 | 8/2014 | Hein |

FOREIGN PATENT DOCUMENTS

| | | | | |
|---|---|---|---|---|
| DE | 10321771 | A1 | 12/2004 | |
| DE | 102008034240 | A1 * | 1/2010 | ......... B60G 17/0523 |
| DE | 102010054713 | A1 | 6/2012 | |
| DE | 102011083614 | A1 | 9/2012 | |
| DE | 102011084921 | A1 | 4/2013 | |
| DE | 102012005303 | A1 | 6/2013 | |
| DE | 102012006382 | A1 | 10/2013 | |
| DE | 102012010390 | A1 | 12/2013 | |
| DE | 102012021597 | A1 * | 5/2014 | ......... B01D 53/0407 |
| DE | 102008034240 | B4 | 12/2014 | |
| DE | 102014012646 | A1 | 2/2016 | |
| DE | 102015222230 | A1 | 5/2017 | |
| WO | WO 02086327 | A1 | 10/2002 | |

* cited by examiner

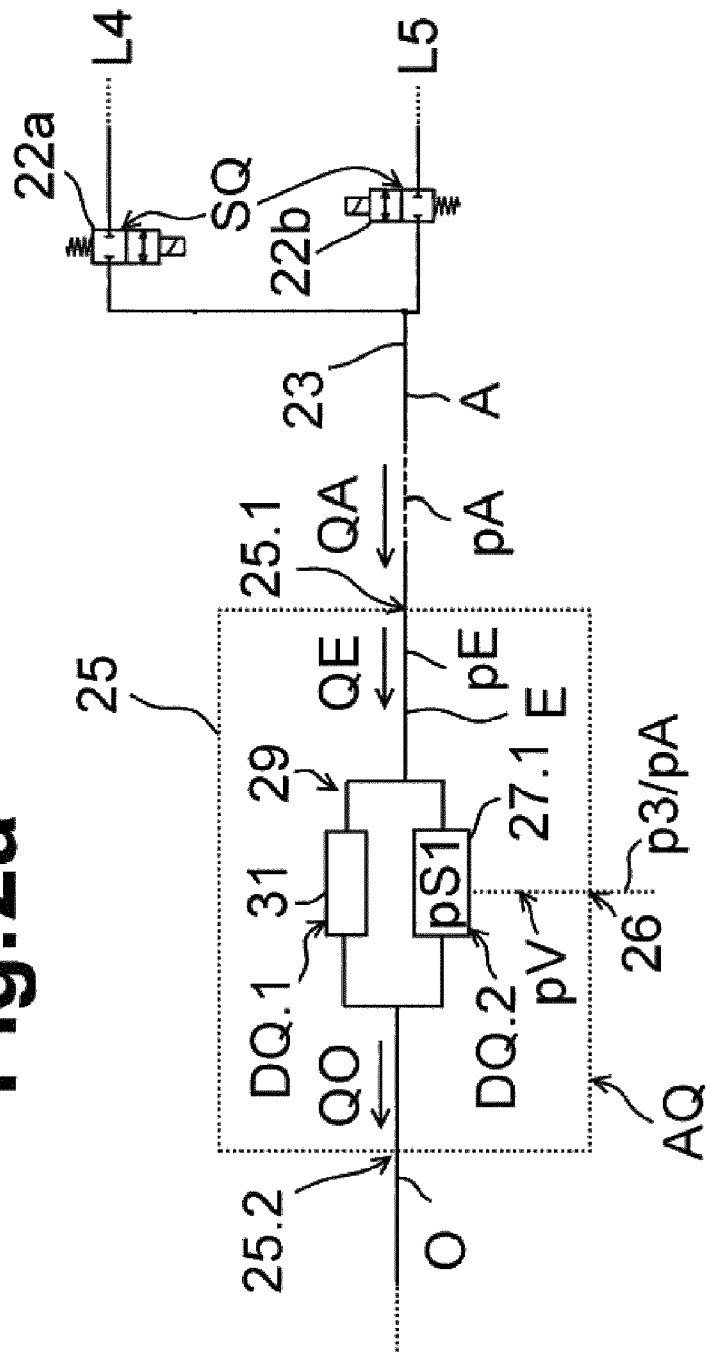

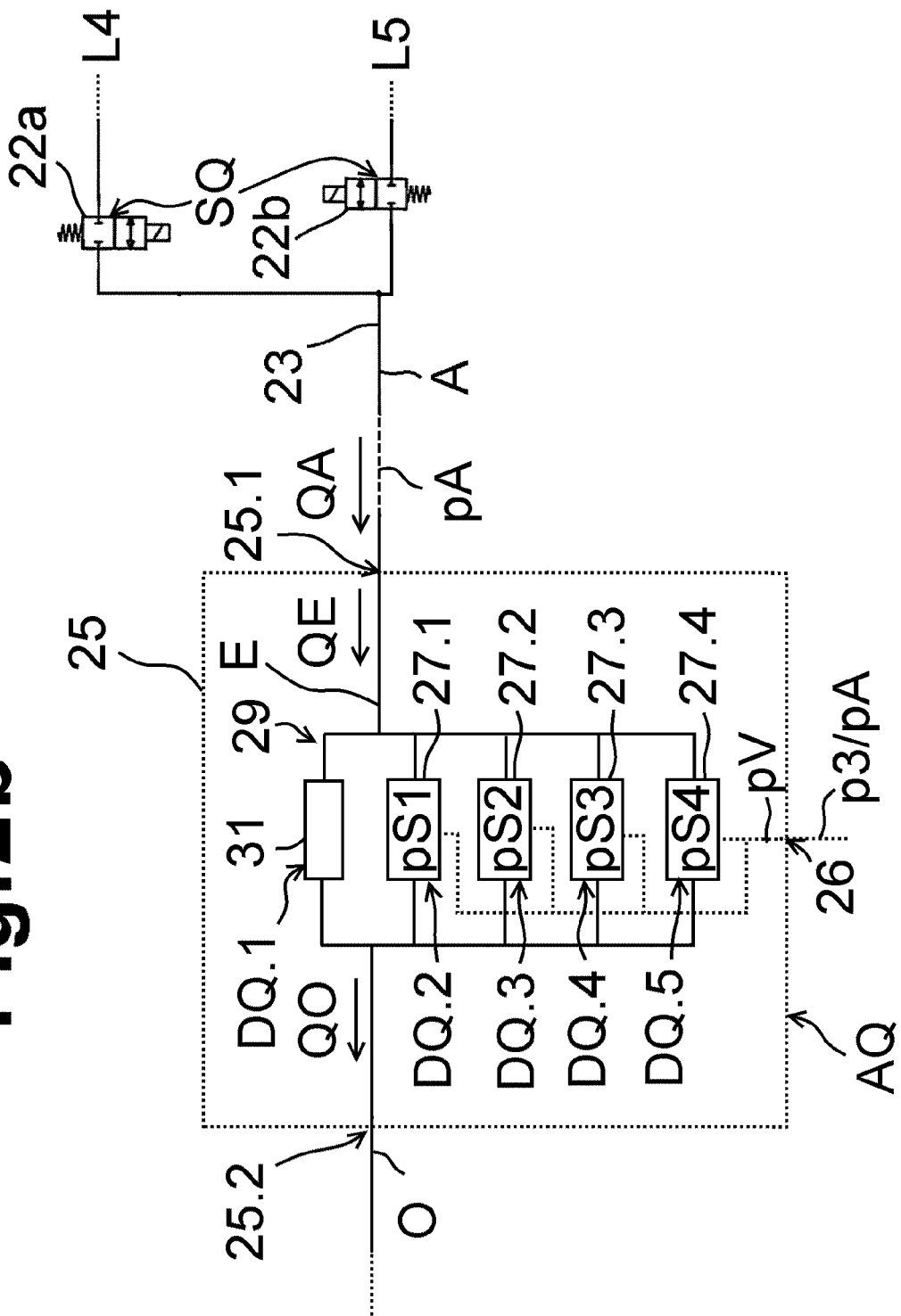

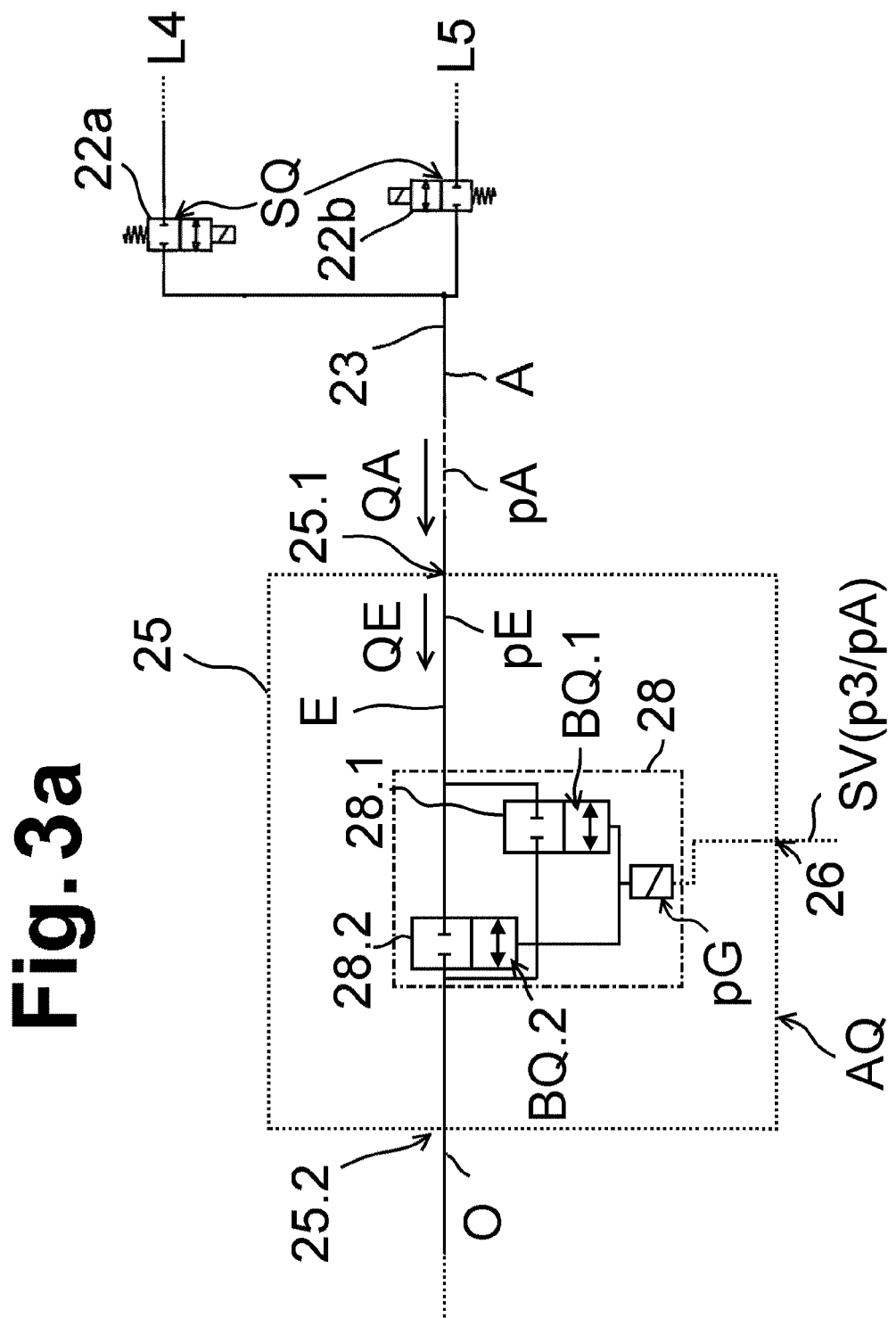

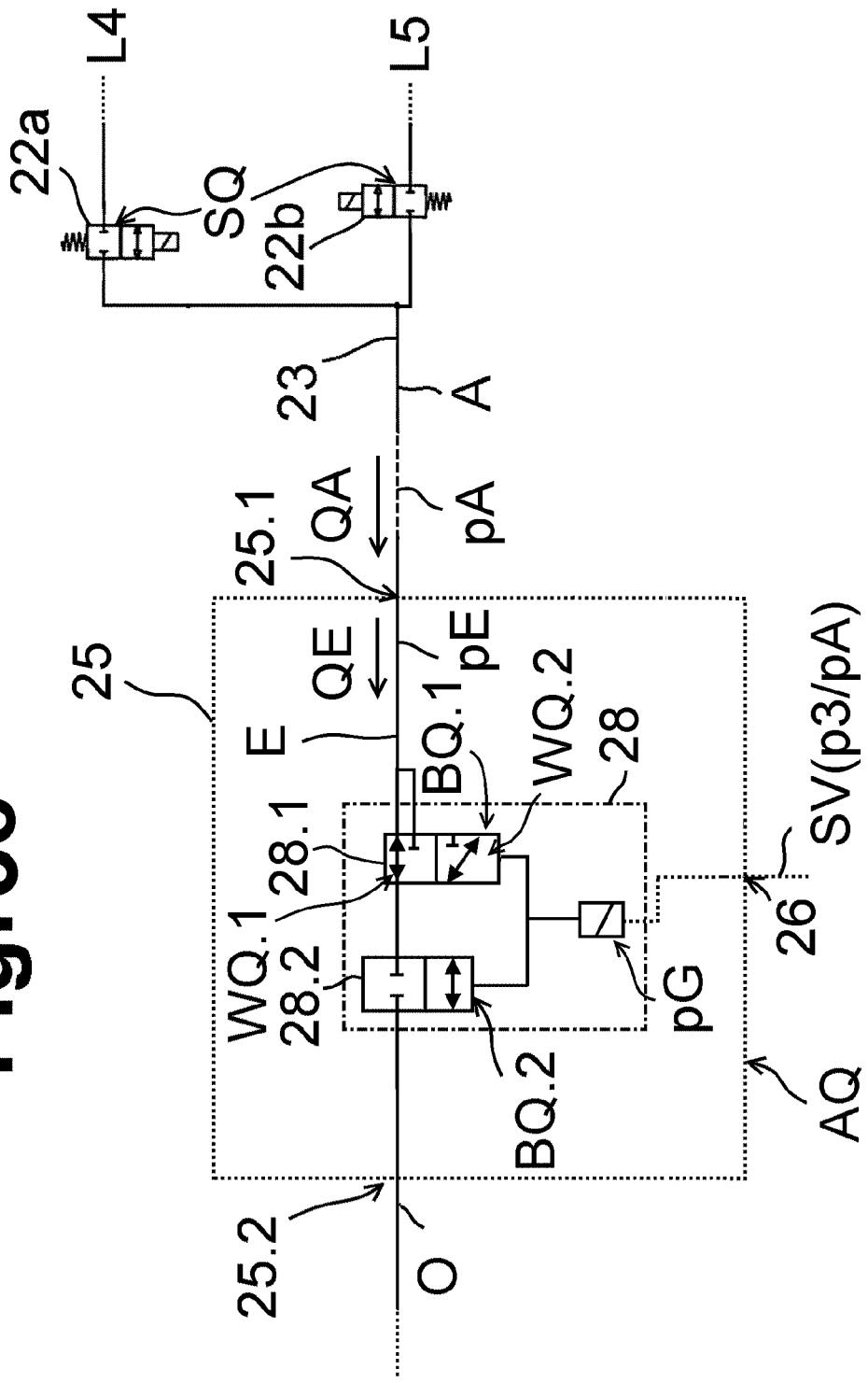

THROTTLE ASSEMBLY AND PRESSURE CONTROL SYSTEM HAVING SUCH A THROTTLE ASSEMBLY

CROSS REFERENCE TO RELATED APPLICATIONS

This application is a U.S. National Phase Application under 35 U.S.C. § 371 of International Application No. PCT/EP2018/059279, filed on Apr. 11, 2018, and claims benefit to German Patent Application No. DE 10 2017 004 414.7, filed on May 5, 2017. The International Application was published in German on Nov. 8, 2018 as WO 2018/202392 under PCT Article 21(2).

FIELD

The invention relates to a throttle assembly, in particular for a pressure control system having a multistage compressor in a vehicle, in particular in a passenger car, and to a pressure control system having such a throttle assembly.

BACKGROUND

Multistage compressors are used to achieve high compression of a pressure medium, in particular a gas, e.g. air, by virtue of the fact that the pressure medium precompressed in a first compression stage is additionally compressed in a subsequent second compression stage. There can also be further compression stages in a cascade, in each of which the pressure medium compressed by the preceding compression stage is compressed further.

If loads such as those in a pneumatic suspension system or in a ride height control system in a vehicle are to be supplied with pressure medium, a multistage compressor of this kind can be used to make the pressure medium available at an appropriate pressure to supply pressure springs. In this case, the multistage compressor compresses the pressure medium from the atmosphere introduced into an intake chamber by means of two or more compression stages and transfers the pressure medium compressed in multiple stages to the pressure springs. As an alternative, it is also possible to use an already compressed pressure medium from a pressure medium reservoir, which is compressed once again by the multistage compressor.

This is described in DE 10 2008 034 240 B4, for example, according to which a ride height control system is provided in which a multistage compressor is used to deliver the pressure medium from the atmosphere or from a pressure medium reservoir, wherein two compression stages are provided. If pressure medium from the atmosphere is compressed, the pressure medium is passed through both compression stages whereas, where the pressure medium is delivered from the pressure medium reservoir, the pressure medium fed to the load is compressed only by the second compression stage. In order to reduce or block the compression work of the first compression stage in this case, a shutoff valve embodied as a 2/2-way valve is provided, said valve preventing delivery of compressed pressure medium from the first compression stage to the second compression stage when there is delivery from the pressure medium reservoir. Here, the shutoff valve is activated electrically by means of a control device.

DE 103 21 771 A1 describes a multistage compressor in which a bypass line that has a pneumatically controllable shutoff valve and that connects an intake chamber of the compressor to the first compression chamber is provided for shutting down the first compression stage. In this case, the pneumatic shutoff valve is opened in accordance with the pressure in the intake chamber, enabling pressure equalization to take place between the intake chamber and the compression chamber. This serves to shut down the first compression stage in accordance with the pressure of the pressure medium admitted to the intake chamber. It is thereby possible to achieve high compression with a low volume flow in single-stage mode in accordance with the pressure medium admitted. In the two-stage mode, on the other hand, a high volume flow is achieved and the pressure medium flows through two compression stages.

According to DE 10 2011 083 614 A1, provision is made in an open operating mode to compress air by two compression stages and to feed the compressed air to a pressure medium reservoir. In a closed operating mode, the already compressed air from the pressure medium reservoir can be admitted to an intermediate volume between the first and the second compression stage and can be compressed again by one of the compression stages before reaching the loads. The circulation of air from the loads to the pressure medium reservoir is furthermore also envisaged. For control, electrically actuated changeover valves are provided, blocking and opening the flow paths for the compressed air or the air to be compressed as appropriate.

DE 10 2012 010 390 A1 describes a ride height control system in which air that has already been compressed by means of a compressor is fed into loads embodied as spring struts from a pressure reservoir in a closed operating mode. To control the pressure in the ride height control system, a pressure limiting function is provided, which is either in the form of a blowoff valve or in the form of a pilot valve, which each discharge air into the atmosphere if the pressure in the system is too high.

SUMMARY

In an embodiment, the present invention provides a throttle assembly for a pressure control system in a vehicle. The pressure control system has a pneumatic load. The throttle assembly includes at least one throttle valve. The at least one throttle valve defines an assembly cross-section of the throttle assembly, the assembly cross-section specifies a flow resistance acting on a pressure medium entering the throttle assembly, and the at least one throttle valve includes at least one controllable throttle valve configured to be controlled in accordance with an upstream pressure. The assembly cross-section of the throttle assembly is configured to be set, by control of the at least one controllable throttle valve, in such a way that an inlet volume flow of the pressure medium entering the throttle assembly can be limited to a limit volume flow in accordance with the upstream pressure, in order to set, in accordance with the upstream pressure, a power consumption of the pneumatic load in the pressure control system. The pneumatic load is connected to the throttle assembly.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
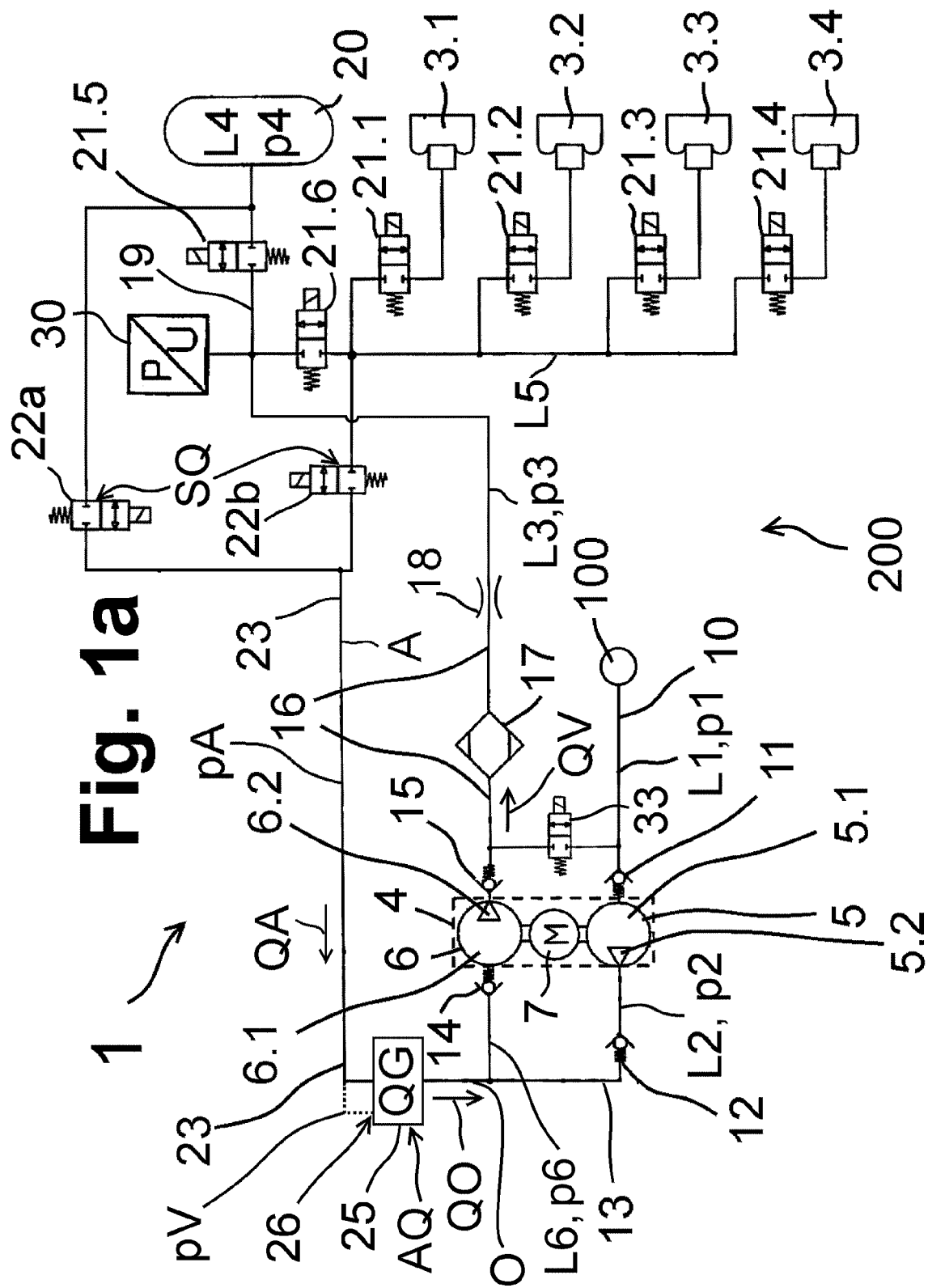
FIGS. 1*a* and *b* show different embodiments of a pneumatic suspension system having a two-stage compressor.

Embodiments of the invention provide throttle assemblies for a pressure control system in a vehicle, in particular a passenger car, via which it is possible to ensure matching of a compression capacity and of a compressed volume flow of the pressure control system in a simple and reliable manner. Embodiments of the invention further provide pressure control systems having a multistage compressor and a throttle assembly.

According to the invention, throttle assemblies are provided that have at least one controllable throttle valve, wherein an inlet volume flow, i.e. a quantity of particles per unit time, of a pressure medium entering the throttle assembly can be limited to a limit volume flow by control of the at least one throttle valve. According to the invention, this purpose can be served by switching over, i.e. opening or closing, the at least one controllable throttle valve in accordance with an upstream pressure in such a way that an effective assembly nominal diameter or an assembly cross section effectively formed by the throttle assembly, which specifies what flow resistance acts on a pressure medium entering the throttle assembly, changes.

For this purpose, the throttle assembly can be arranged in a pressure medium line leading to a pneumatic load. The pressure medium entering the throttle assembly can thus be the pressure medium which is to be delivered by the pressure medium line to the pneumatic load and which has a defined inlet volume flow at a certain inlet pressure at a throttle inlet of the throttle assembly. The pneumatic load can then be supplied with an outgoing pressure medium, an outlet pressure medium, the volume flow of which can be limited by the throttle assembly and which has an outlet volume flow which is less than or equal to the limit volume flow.

It is thereby possible to achieve the advantage that overloading of the pneumatic load, e.g. of a multistage compressor of a pressure control system, by an excessive volume flow of the pressure medium delivered in the pressure medium line can be avoided. According to the invention, this can be ensured by virtue of the fact that the inlet volume flow of the entering pressure medium can be limited by upstream-pressure-dependent setting of the assembly cross section of the throttle assembly to the limit volume flow. For this purpose, the limit volume flow is preferably chosen according to the maximum volume flow to which the pneumatic load is subjected in the current operating mode without the occurrence of an overload, in particular due to excessive energy consumption. As the upstream pressure that can be used for this purpose, it is possible to use the inlet pressure or a compression pressure starting from the pneumatic load in the direction of flow, said pressures being respectively a measure of the current loading of the pneumatic load or the loading of the pneumatic load that can be expected.

In this case, the throttle assembly can be arranged in the pressure control system of a vehicle, in particular of a passenger car, in a charging line, via which an already compressed charging pressure medium having a charging volume flow is delivered to any desired compression stage of the multistage compressor for renewed compression in a closed operating mode, wherein the multistage compressor is subjected to different loading in accordance with the level of the charging volume flow in order to compress the charging pressure medium again. The throttle assembly can advantageously ensure that the charging volume flow of the already compressed charging pressure medium is limited in accordance with an upstream pressure, and the multistage compressor is thus not overloaded, wherein overloading can be caused, for example, if an excessive torque is demanded from a motor driving the compression stages in the case of an excessive volume flow and, as a result, a required current rises beyond a current limit of, for example, 35 A. It is thus possible to match a power consumption of the multistage compressor to the power limit in the closed operating mode of the pressure control system. This can be used to optimize the multistage compressor, thus enabling optimum matching, especially of the compression volume flow from the second or last compression stage. Thus, throttle assemblies according to the invention can operate a multistage compressor very close, even as close as possible, to the power limit, wherein finely graduated adaptation of the assembly cross section is ideally desired for this purpose.

As the upstream pressure, use is made, for example, of the charging pressure acting ahead of the throttle assembly in the charging line in the direction of flow or the compression pressure acting at the outlet of the multistage compressor, with which the connected loads, e.g. pneumatic springs, are supplied. Each of the two variables is a measure of the power consumption and thus the current loading of the multistage compressor or the loading thereof which is to be expected.

The setting of the assembly cross section in accordance with the upstream pressure serves to match the outlet volume flow prevailing at a throttle outlet of the throttle assembly to the pneumatic load and thus to ensure optimum operation of the pneumatic load:

If, for example, a high inlet volume flow of the entering pressure medium is present owing to a high inlet pressure as the upstream pressure, a small assembly cross section is set by closing at least one throttle valve. By virtue of the small assembly cross section selected, an inlet volume flow that exceeds the limit volume flow can be lowered at least to the limit volume flow. The throttle assembly then outputs to the pneumatic load an outlet pressure medium with an outlet volume flow which corresponds to no more than the limit volume flow.

With a low inlet volume flow of the entering pressure medium and a low inlet pressure as the upstream pressure, a large assembly cross section is correspondingly set. As a result, there is a smaller reduction in the inlet volume flow than in the case of a small assembly cross section, wherein the assembly cross section is selected in such a way in this case that the low inlet volume flow is reduced only if the latter actually exceeds the limit volume flow. If this is not the case, the inlet volume flow is output directly as the outlet volume flow to the pneumatic load. Any reduction in the inlet volume flow is then the result of losses due to flow through the lines and throttle valves in the throttle assembly.

The assembly cross section is thus advantageously chosen so that the inlet volume flow of the entering pressure medium is not reduced unnecessarily and the pneumatic load is at the same time not overloaded by an excessive outlet volume flow. This is because the assembly cross section matched to a high inlet volume flow, by means of which overloading of the pneumatic component at high inlet volume flows is avoided, may in certain circumstances also reduce a low inlet volume flow of an entering pressure medium, which is however already below the limit volume flow and thus does not lead to overloading of the pneumatic load.

As compared with a throttle valve fixed to a set value, which has a fixed throttle valve cross section that is matched only to high inlet volume flows, it is thus possible with throttle assemblies according to the invention to use the upstream pressure to set an assembly cross section matched to current operation or to current loading of the pneumatic load and thus to set an optimized outlet volume flow with a corresponding outlet pressure for output to the pneumatic load.

In order to achieve this, the throttle assembly or the at least one throttle valve can be designed and controlled as follows in accordance with the upstream pressure, which represents a variable that is actually present and can be measured during operation, in respect of the loading of the pneumatic load which is currently to be expected:

According to a first embodiment, the throttle assembly has a non-controllable throttle valve having a first throttle valve cross section and, connected in parallel therewith, a controllable throttle valve having a second throttle valve cross section. The non-controllable throttle valve is permanently in the open position. However, it is also possible for the non-controllable throttle valve to be replaced by a controllable throttle valve. The controllable throttle valve can be controlled pneumatically or electrically in accordance with the upstream pressure, wherein the controllable throttle valve can be switched over, i.e. completely opened or completely closed, via the control. The parallel circuit of the two throttle valves can also be expanded by further controllable throttle valves connected in parallel in order in this way to generate many throttle gradations, allowing finely graduated adaptation of the assembly cross section.

Here, the effective assembly cross section acting on the entering pressure medium is the sum of the throttle valve cross sections of all the throttle valves connected in parallel with one another that are in the open position. The effects on the entering pressure medium are comparable with a parallel circuit of resistors:

The more throttle valves are switched over to the closed position, the smaller the effective assembly cross section available to the entering pressure medium for passage through the throttle assembly becomes, i.e. the higher is the flow resistance acting on the pressure medium. The effective assembly cross section is therefore reduced with each closed throttle valve of the parallel circuit, making it possible, by controlling the throttle valve or valves in accordance with the upstream pressure, to reduce the correspondingly present inlet volume flow of the entering pressure medium in order to reduce this volume flow to or below the limit volume flow.

Control of the switchable throttle valve or valves is accomplished directly by way of the pneumatically specified upstream pressure or by means of an electric signal produced in accordance with the upstream pressure. If the upstream pressure is higher than a closing pressure assigned to the switchable throttle valve, the switchable throttle valve is closed. That is to say that the pressure medium entering the throttle assembly now has one less throttle valve available in the parallel circuit to flow through the throttle assembly, and the assembly cross section is effectively reduced, thereby making available a reduced outlet volume flow that can be fed to the multistage compressor as a charging volume flow.

Multistage adaptation in a parallel circuit of a plurality of controllable throttle valves can preferably also be performed. For this purpose, throttle valves in the parallel circuit are successively closed as the upstream pressure rises, thereby successively reducing the assembly cross section of the throttle assembly. In this case, each switchable throttle valve is assigned a different closing pressure. Thus, depending on the construction of the parallel circuits of throttle valves in the throttle assembly, multistage control can thus be achieved in order to make the most efficient possible use of the pneumatic load without overloading it and to enable it to be operated always just below or at the power limit.

Arranged ahead of the throttle assembly in the flow path is at least one switching valve, by means of which the pressure medium flowing to the throttle assembly via the pressure medium line can be released under electronic or pneumatic control, for example. As an alternative, in the case where all the throttle valves are electrically controllable and the charging pressure means comes from just one charging source, i.e. either only from the pressure medium reservoir or only from the loads, the switching valve can be omitted since flow through the throttle assembly and thus release of the charging pressure medium can be completely prevented by the electric closure of all the throttle valves, wherein the electronic control of the throttle valves can then be accomplished by means of software logic which either closes all the throttle valves to prevent through flow or closes them individually in accordance with the upstream pressure in order to reduce the inlet volume inflow accordingly.

In the pressure control system, it is thereby possible to achieve release of the charging pressure medium, thus enabling said medium to flow to the multistage compressor via the throttle assembly. By means of its switching valve nominal diameter or its switching valve cross section, this switching valve simultaneously defines the maximum inlet volume flow of the pressure medium entering the throttle assembly. Here, the switching valve cross section selected can be large since the loading of the pneumatic load is set subsequently by means of the throttle assembly connected in series with the switching valve. In particular, the switching valve cross section can be designed for low inlet pressures, and therefore there is advantageously no unnecessary reduction of the inlet volume flow by the switching valve.

The throttle valve cross sections of the individual throttle valves in the throttle assembly can then be designed in such a way that a sum of the throttle valve cross sections—i.e. the assembly cross section when all the throttle valves are open—does not exceed the switching valve cross section since a larger assembly cross section then no longer has any effect on the inlet volume flow of the entering pressure medium. As a result, it is advantageously possible for the assembly cross section to be successively reduced, starting from the switching valve cross section, since, in the case where all the throttle valves connected in parallel in the throttle assembly are open, the assembly cross section is equal to the switching valve cross section. The inlet volume flow entering the throttle assembly from the switching valve is then reduced only slightly by flowing through the respective throttle valves and the lines in the throttle assembly, i.e. essentially by losses. When individual throttle valves are closed, the assembly cross section is reduced accordingly from the switching valve cross section.

According to an alternative embodiment, the throttle assembly can have just one controllable throttle valve, which is embodied as a double armature valve. In this valve, either a first armature or a second armature connected in a complementary parallel arrangement or in series therewith can be switched in accordance with the upstream pressure, wherein each armature preferably has a different armature cross section. It is thereby advantageously possible to achieve a small and compact construction since the two armatures can be used to switch between two different assembly cross sections when the upstream pressure falls below or exceeds a limit pressure, and just one coil of the double armature valve is required for this switching process.

According to a first embodiment, the two armatures are connected in parallel with one another. In this case, each armature can be transferred to a closed position or an open position. If only the first armature is switched into the open position, the assembly cross section is determined exclusively by a first armature cross section while, if only the second armature is opened, a second armature cross section is decisive. If both armatures are opened simultaneously, the assembly cross section is the sum of both armature cross sections, which can be the same or different, depending on requirements.

According to an alternative embodiment, the two armatures are connected in series. According to this embodiment, a bypass line that bridges the first armature is furthermore provided, said line having a bypass cross section which is smaller than the first and the second armature cross section, wherein the sum of the first armature cross section and the bypass cross section is at least as large as the second armature cross section. If the second armature is opened and the first armature remains closed, the pressure medium flows through the bypass line into the second armature, and, owing to the in-series connection, the assembly cross section is determined by the smaller of the two cross sections, in this case by the bypass cross section. If, however, the first armature is also opened, the pressure medium flows both through the first armature and through the bypass line, which are arranged in a parallel circuit, into the second armature. In this case, the sum of the first armature cross section and the bypass cross section (parallel circuit) is larger than or equal to the second armature cross section (series circuit), with the result that the assembly cross section is determined by the second armature cross section. As an alternative, it would also be possible for the first armature cross section to determine the minimum cross section together with the bypass cross section. It is furthermore also possible for the bypass line to bridge the second armature instead of the first armature, with correspondingly adapted cross sections.

If the second armature in this series circuit is closed, there is a total shutdown, i.e. no pressure medium can flow through the throttle assembly with the double armature valve.

Alternatively, it is also possible for the bypass line in the series circuit of the two armatures to be omitted. The first armature is then embodied instead like a 3/2-way valve and, in a first operating position of the first armature, a first pressure medium path with a first path cross section is opened and, in a second operating position, a second pressure medium path with a second path cross section is opened. Depending on the operating position, the first armature cross section is thus variable, wherein the first path cross section is smaller than the second armature cross section, and the second path cross section corresponds at the maximum to the second armature cross section. Thus, the assembly cross section is either the first path cross section or the second path cross section, depending on the operating position.

For a total shutdown, the second armature in this embodiment can be transferred to the closed position, with the result that pressure medium is prevented from flowing through.

Thus, if the inlet volume flow is high, the corresponding inlet pressure as the upstream pressure can be used to choose which of the two armatures is connected in parallel or in series with which armature cross section in order to set a low assembly cross section while, in the case of a low inlet volume flow, a different operating position of the armature is set for this corresponding inlet pressure as the upstream pressure in order to set a large assembly cross section. Thus, according to this embodiment, the assembly cross section can be switched over in two stages, depending on the upstream pressure, according to whether the upstream pressure does or does not exceed the limit pressure.

The double armature valve is controlled by means of an electric control signal, which is produced in accordance with the upstream pressure, preferably by means of software logic, wherein the upstream pressure is compared with a corresponding closing pressure and, in accordance therewith, the first and/or the second armature is switched. By means of the software logic, the double armature valve can also be transferred into the fully closed position.

In different variants, it is thus possible by simple means to ensure automatically controlled volume flow limitation which adjusts the pneumatic load, e.g. the multistage compressor, appropriately in order, for example, to allow operation just below a power limit of the pneumatic load, for example.

An open operating mode of the pressure control system, in which uncompressed pressure medium from the atmosphere is compressed by the multistage compressor, is advantageously unaffected by the throttle assembly since the throttle assembly is arranged only in that part of the pressure control system through which pressure medium does not flow in the open operating mode.

The throttle assembly can be retrofitted in an advantageously simple and low-cost manner since the throttle assembly can be installed as a compact component in an existing pressure medium line, e.g. the charging line of the pressure control system, with an already existing switching valve which releases the compressed pressure medium, e.g. the charging pressure medium. The outlay for retrofitting can thus be kept low.

Figure 1B:
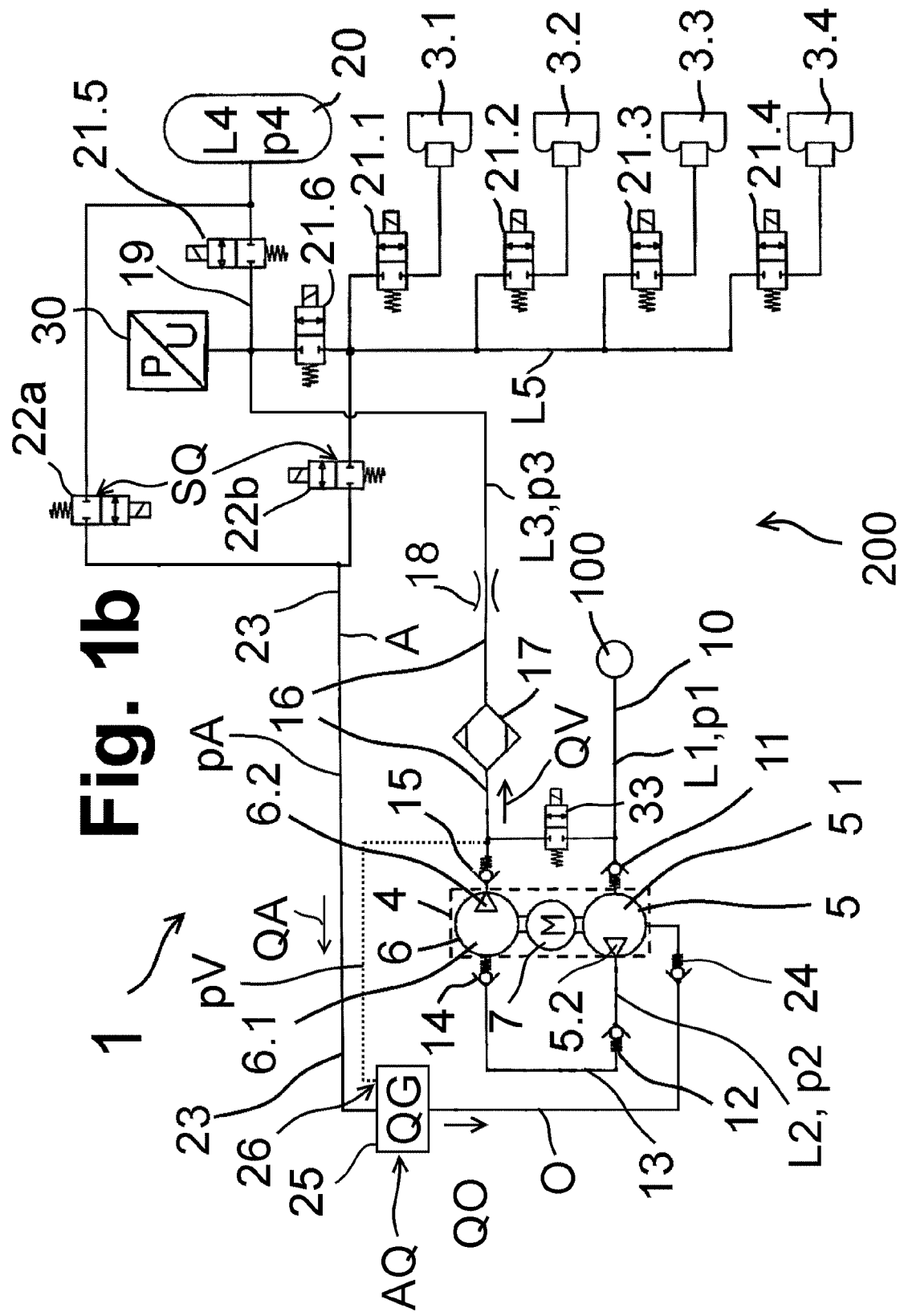

According to FIGS. 1a and 1b, a pressure control system, e.g. a pneumatic suspension system 1, is provided, which has four pressure medium chambers 3.1, 3.2, 3.3, 3.4, which are each assigned to one load, e.g. pneumatic springs of a vehicle 200. The pressure medium chambers 3.i are supplied with a compressed pressure medium L3, e.g. air, wherein the compressed pressure medium L3 is compressed in a two-stage compressor 4.

For this purpose, the two-stage compressor 4 has a first compression stage 5 and a second compression stage 6, which each have an intake chamber 5.1, 6.1 and a compression chamber 5.2, 6.2, wherein the pressure medium L1, L2, L6 flowing into the respective intake chamber 5.1, 6.1 is compressed in the compression chamber 5.2, 6.2. The compression stages 5, 6 are driven by a motor 7, which has the effect that a piston situated in the respective compression stage 5, 6 moves up and down and thereby correspondingly compresses the pressure medium L1, L2, L6 made available in the intake chamber 5.1, 6.1.

According to this embodiment, the pressure control system 1 can be operated in two operating modes, an open operating mode BMo (open mode) and a closed operating mode BMc (closed mode), in each of which air is delivered and compressed as the pressure medium L1, L2, L3, L4, L5, L6. In the open operating mode BMo, intake air L1 from the atmosphere 100, i.e. having an air pressure or intake pressure p1 of about 1 bar, is introduced via an intake line 10 and a first inlet valve 11 into the first intake chamber 5.1 of the first compression stage 5. The intake air L1 is then first of all precompressed and, during this process, passed into the first compression chamber 5.2. From the first compression chamber 5.2, the precompressed air L2 having an intermediate pressure p2 flows into an intermediate volume 13 via a first outlet valve 12, e.g. a check valve.

From the intermediate volume 13, the precompressed air L2, in particular, passes via a second inlet valve 14 into the second intake chamber 6.1 of the second compression stage 6, in which the precompressed air L2 is compressed further and introduced into the second compression chamber 6.2. From the second compression stage 6, the compressed air L3 having a compression pressure p3 and a compression volume flow VQ passes via a second outlet valve 15 into an outlet line 16 leading to an air dryer 17 and a restrictor 18. The outlet line 16 then carries the compressed air L3 to the pressure medium chambers 3.1, 3.2, 3.3, 3.4 of the connected loads, e.g. of the pneumatic springs, and via a reservoir line 19 to a pressure medium reservoir 20, in which the compressed air L3 is stored as stored air L4 having a reservoir pressure p4, which is somewhat lower than the compression pressure p3 owing to losses.

The pressure medium reservoir 20 and the pressure medium chambers 3.1, 3.2, 3.3, 3.4 can each be connected by a controllable valve 21.1, 21.2, 21.3, 21.4, 21.5, 21.6, e.g. a 2/2-way solenoid valve, to the outlet line 16 or the reservoir line 19, thus enabling the compressed air L3 to flow into the pressure medium chambers 3.1, 3.2, 3.3, 3.4 to control the loads or into the pressure medium reservoir 20, depending on the position of the controllable valves 21.i.

Accordingly, the compressed air L3 is passed into the first pressure medium chamber 3.1 when the sixth valve 21.6 is open and the first valve 21.1 is open, into the second pressure medium chamber 3.2 when the second valve 21.2 is open, into the third pressure medium chamber 3.3 when the third valve 21.3 is open, and into the fourth pressure medium chamber 3.4 when the fourth valve 21.4 is open, in which case the fifth valve 21.5 is closed and thus no compressed air L3 can flow into the pressure medium reservoir 20.

If, on the other hand, the valves 21.1, 21.2, 21.3, 21.4, 21.6 are in the closed position and the fifth valve 21.5 is open, air L3 dried and compressed by the air dryer 17 can be introduced into the pressure medium reservoir 20 and stored therein. Pressure monitoring can be performed by means of a pressure measuring unit 30.

By means of an additional blowoff valve 33, the compressed air L3 can be discharged into the atmosphere 100.

In the closed operating mode BMc, the air L4 stored in the pressure medium reservoir 20 can be let into the intermediate volume 13 as a charging pressure medium A, with the result that the already compressed air L4 is compressed once again. For this purpose, according to this embodiment, the fifth valve 21.5 is closed, and a first switching valve 22a is opened, said switching valve being arranged in a charging line 23 branching off between the fifth valve 21.5 and the pressure medium reservoir 20. In this case, the second switching valve 22b is closed. According to the embodiment in FIG. 1a, the charging line 23 is connected to the intermediate volume 13 and, according to the embodiment in FIG. 1b, said charging line is connected to the first compression stage 5 via a third inlet valve 24, with the result that, in the open position of the first switching valve 22a, the stored air L4 can flow into the intermediate volume 13 and into the second intake chamber 6.1 (FIG. 1a) or, via the third inlet valve 24, into the first intake chamber 5.1 (FIG. 1b). Thus, the compressed air L4 can be compressed again by the second compression stage 6 or the first and the second compression stage 5, 6. If more than two compression stages 5, 6 are provided in the compressor 4, the charging pressure medium A can also be let into any other compression stage via the charging line 23.

If return of chamber air L5 from the pressure medium chambers 3.i to the pressure medium reservoir 20 is desired in the closed operating mode BMc, the valve 21.i (where i=1 . . . 4) assigned to the respective pressure medium chamber 3.i and a second switching valve 22b are opened, and the sixth valve 21.6 is closed, with the result that the chamber air L5 is let into the charging line 23 as charging pressure medium A. In this case, the first switching valve 22a is likewise closed, and the fifth valve 21.5 is opened to allow return to the pressure medium reservoir 20. If only renewed compression of stored air L4 is envisaged in the pressure control system 1, it is also possible for the path via the second switching valve 22b to be omitted.

To control the power consumption of the multistage compressor 4 in the case of renewed compression of the charging pressure medium A in the closed operating mode BMc, a throttle assembly 25 is provided in the charging line 23, by means of which assembly a charging volume flow QA of the charging pressure medium A flowing in the charging line 23 can be limited to a limit volume flow QG.

For this purpose, the throttle assembly 25 has a pneumatic control input 26, via which an upstream pressure pV can be transmitted to the throttle assembly 25, wherein, according to FIG. 1a, it is the charging pressure pA of the charging pressure medium A and, according to FIG. 1b, the compression pressure p3 of the air L3 compressed by the multistage compressor 4 which are applied as upstream pressures pV to the control input 26 of the throttle assembly 25. Conversely, it is also possible, in FIG. 1a, for the compression pressure p3 and, in FIG. 1b, for the charging pressure pA to be used as upstream pressures pV. It is also possible to make direct use of the inlet pressure pE entering the throttle assembly 25 to be used as the upstream pressure pV, which corresponds approximately to the charging pressure pA.

Instead of pneumatic input of the corresponding upstream pressure pV to the throttle assembly 25, electric input by means of an electric upstream pressure signal SV can also be implemented, wherein the electric upstream pressure signal SV then transmits a value corresponding to the upstream pressure pV to the control input 26 of the throttle assembly 25, the control input in that case being electric.

Here, the upstream pressure pV serves as a measure of a current loading (p3 as upstream pressure pV) or currently to be expected loading (pA as upstream pressure pV) of the multistage compressor 4 as the pneumatic load in the pressure control system 1. In accordance therewith, an assembly cross section AQ can be set in the throttle assembly 25 in order to limit the charging volume flow QA, wherein the assembly cross section AQ indicates an effective line cross section of the throttle assembly 25, through which the charging pressure medium A flows as it passes through the throttle assembly 25.

Figure 2C:
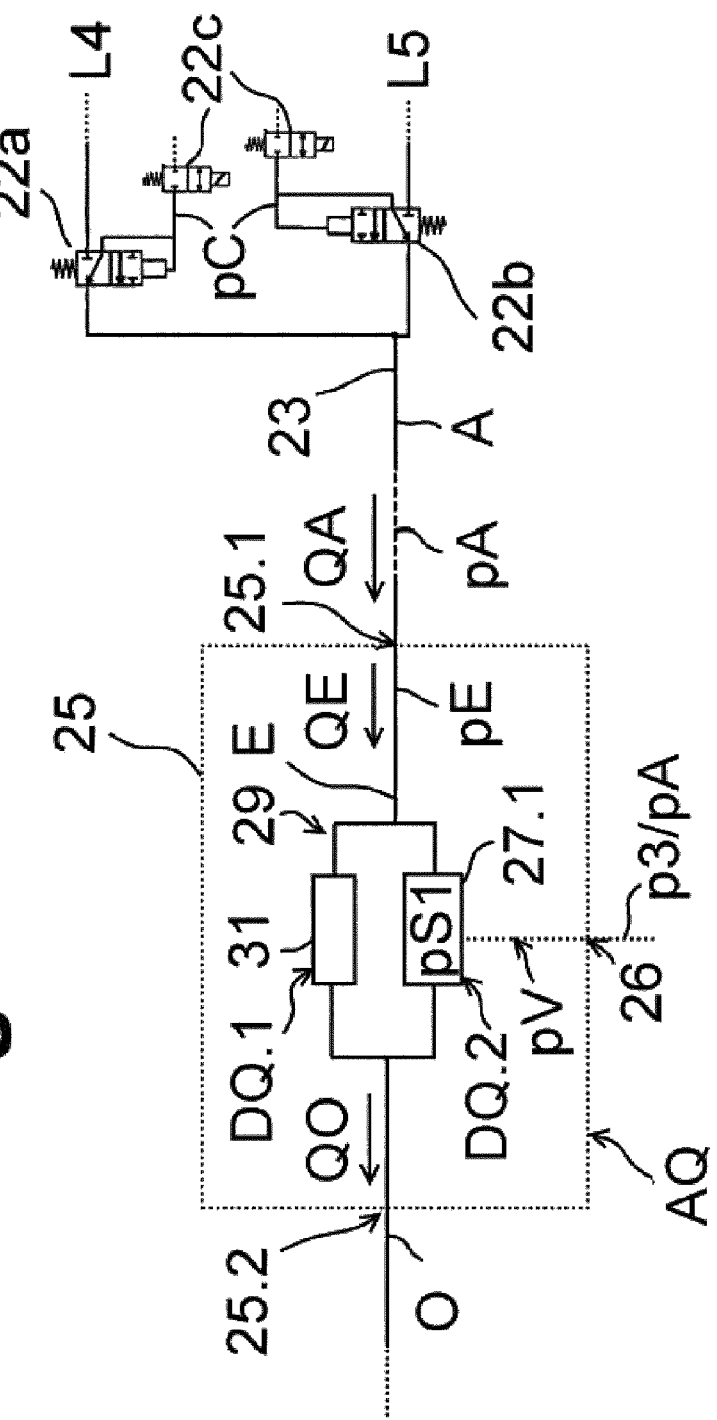
FIGS. 2*a, b*, and *c* show throttle assemblies according to a first embodiment.

To achieve this, different design embodiments may be considered, as shown in FIGS. 2a, 2b, 2c and 3a, 3b, 3c:

According to a first embodiment, it is envisaged in FIGS. 2a, 2b and 2c that the charging pressure medium A is fed to the throttle assembly 25 as the entering pressure medium E via a throttle inlet 25.1. For this purpose, the throttle inlet 25.1 is connected via the charging line 23 to the two switching valves 22a, 22b, which each have a switching valve cross section SQ of between 0.5 mm and 4 mm, via which the charging volume flow QA is already limited in advance, with the switching valves 22a, 22b being opened alternatively, since only a limited volume flow can pass through the switching valves 22a, 22b owing to the switching valve cross section SQ. In FIGS. 2a and 2b, the switching valves 22a, 22b are electronically controlled and, by this means, one of the switching valves 22a, 22b is opened as soon as a demand is made electrically to change to the closed operating mode BMc, in which the stored air L4 or the chamber air L5 is released as the charging pressure medium A.

An inlet volume flow QE prevailing at the throttle inlet 25.1 and an inlet pressure pE are thus defined by the charging volume flow QA and the charging pressure pA, respectively.

A parallel circuit 29 of throttle valves 31, 27.1 is provided in the throttle assembly 25, wherein a non-controllable throttle valve 31 and a controllable throttle valve 27.1 are provided. The controllable throttle valve 27.1 is controlled by means of the upstream pressure pV introduced at the pneumatic control input 26, which corresponds either to the compression pressure p3 (FIG. 1b) or the charging pressure pA (FIG. 1a). The controllable throttle valve 27.1 is assigned a closing pressure pS1, wherein the controllable throttle valve 27.1 is closed by the upstream pressure pV when the closing pressure pS1 is exceeded.

The non-controllable throttle valve 31 has a first throttle valve cross section DQ.1 and the controllable throttle valve 27.1 has a second throttle valve cross section DQ.2. If both throttle valves 31, 27.1 are in the open position, the assembly cross section AQ is the sum of the two throttle valve cross sections DQ.1, DQ.2 and determines which line cross section acts on the entering pressure medium E, i.e. the charging pressure medium A, in the throttle assembly 25 and thus determines whether and by how much the inlet volume flow QE is reduced as it flows through the throttle assembly 25.

Here, the throttle valve cross sections DQ.j are chosen so that the assembly cross section AQ when the throttle valves 31, 27.1 are open corresponds approximately to the switching valve cross section SQ, with the result that, in the open position of the non-controllable and the controllable throttle valve 31, 27.1, the inlet volume flow QE is reduced only by losses during flow through the throttle assembly 25. The controllable throttle valve 27.1 can now be closed in accordance with the upstream pressure in order to reduce the assembly cross section AQ. The entering charging pressure medium A then has only the possibility of flowing through the non-controllable throttle valve 31. The flow resistance for the charging pressure medium A rises, as a result of which the charging volume flow QA or inlet volume flow QE is reduced.

The controllable throttle valve 27.1 is closed, in particular, when the closing pressure pS1 has been exceeded, i.e. when the loading of the multistage compressor 4 as the pneumatic load, said loading being characterized by the upstream pressure pV, exceeds a defined maximum value, with the result that overloading of this load would occur. In this case, the assembly cross section AQ is reduced to increase the flow resistance for the charging pressure medium A and to reduce the inlet volume flow QE to an outlet volume flow QO, which is less than or equal to a limit volume flow QG. This is accomplished by means of the upstream pressure pV, which is a measure of the current loading or currently to be expected loading of the multistage compressor 4 as the pneumatic load in the pressure control system 1, and the controllable throttle valve 27.1 is opened or closed in accordance therewith in this example.

A volume-flow-limited outlet pressure medium O with an outlet volume flow QO is thus present at a throttle outlet 25.2 of the throttle assembly 25, and this is fed to the multistage compressor 4 either in the first compression stage 5 (FIG. 1b) or via the intermediate volume 13 of the second compression stage 6 (FIG. 1a) for renewed compression. Since the outlet volume flow QO is less than or equal to the limit volume flow QG, the multistage compressor 4 therefore operates below its power limit, i.e. it is not overloaded.

In the closed operating mode BMc, there is a mixed pressure medium L6 in the intermediate volume 13 of the multistage compressor 4 according to the embodiment in FIG. 1a, this pressure medium containing a mixture of the volume-flow-limited outlet pressure medium O and the precompressed pressure medium L2. This mixed pressure medium L6 is delivered at a mix pressure p6 and a mix volume flow QM to the second compression stage 6 for renewed compression. In the embodiment in FIG. 1b, in contrast, the intermediate volume contains only the precompressed pressure medium L2, which is already mixed with the intake air L1 in the first intake chamber 5.1.

According to the enhancement in FIG. 2b, further switchable throttle valves 27.i are arranged in the parallel circuit 29. Each of the switchable throttle valves 27.i is assigned a different closing pressure pSi, i=1, . . . , 4 in such a way that the switchable throttle valves 27.i are closed successively as the upstream pressure pV rises. Thus, at a low upstream pressure pV, all the switchable throttle valves 27.i are still open, and the assembly cross section AQ corresponds approximately to the switching valve cross section SQ. Here, the throttle valve cross sections DQ.j are likewise equal in total to the switching valve cross section SQ, thus enabling the inlet volume flow QE to be reduced by successively closing individual throttle valves 27.i. It is thereby possible to achieve improved gradation since the reduction of the inlet volume flow QE can be set in finer gradations by means of multistage control of the assembly cross section AQ. It is thereby possible to make more efficient use of the multistage compressor 4 without overloading since said compressor is operated just below the power limit.

According to FIG. 2c, additional provision is made to switch the switching valves 22a, 22b pneumatically, wherein the switching valves 22a, 22b are then embodied as 3/2-way valves, for example. For this purpose, each switching valve 22a, 22b is assigned an electrically controllable control valve 22c, which, when there is an electric demand to release the charging pressure medium A, i.e. the compressed air L4 or the chamber air L5, applies a control pressure pC to the respective switching valve 22a, 22b, with the result that said switching valve moves into the open position and thereby alternatively releases the corresponding charging pressure medium A, L4, L5. It is thereby possible to select less-expensive pneumatic switching valves 22a, 22b with a larger switching valve cross section SQ and to embody the electric control valve 22c with a smaller cross section, thereby advantageously making it possible to save costs.

Figure 3B:
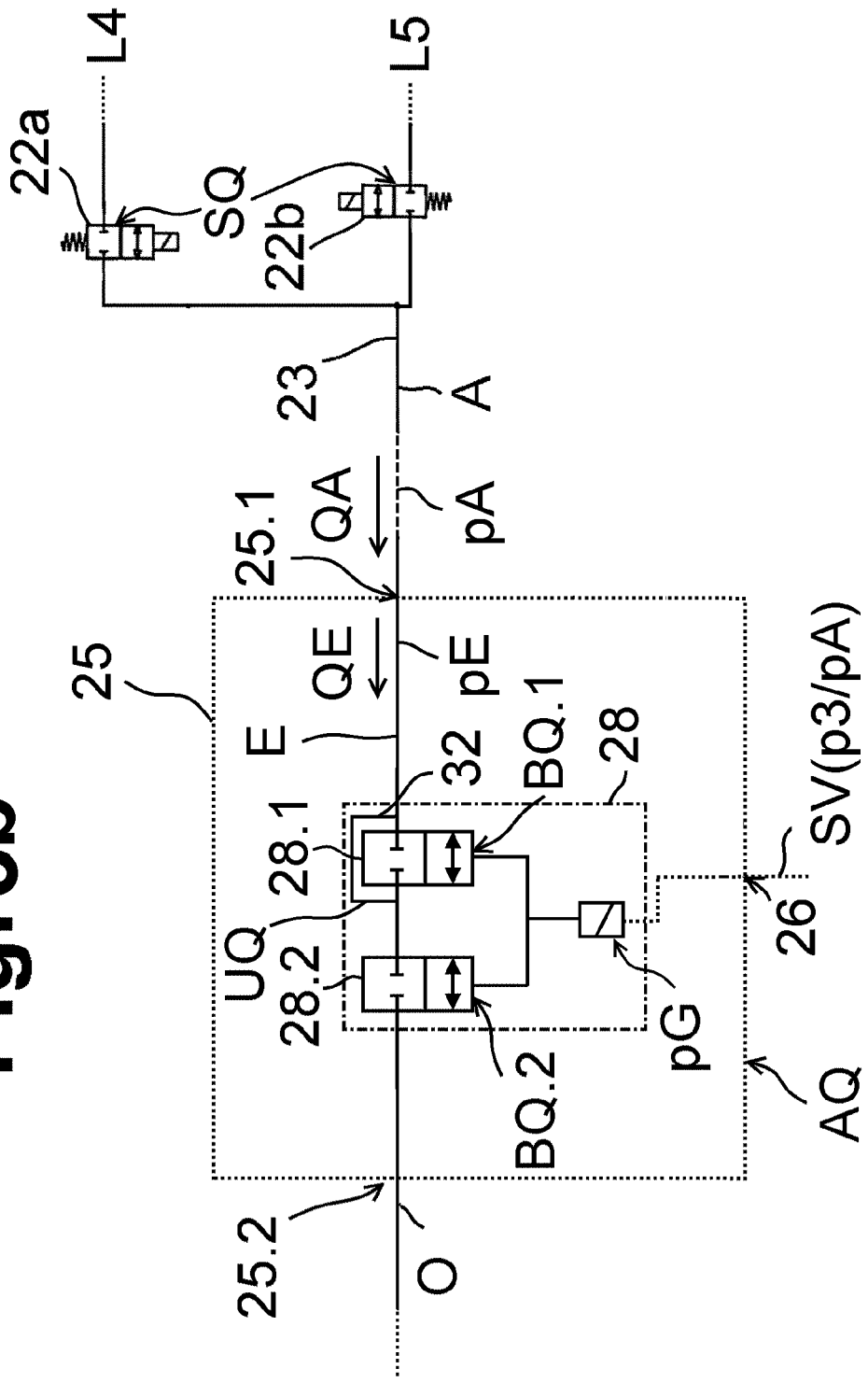
FIGS. 3*a, b*, and *c* show a throttle assembly according to a second embodiment having a double armature valve.

According to FIGS. 3a, 3b, 3c, a second embodiment of the throttle assembly 25 is illustrated, in which just one throttle valve 28 is provided, which is embodied as a double armature valve. The double armature valve 28 has a first armature 28.1 and a second armature 28.2, which can be transferred to an open or a closed operating position, illustrated in FIGS. 3a, 3b, in accordance with the compression pressure p3 (FIG. 1b) or the charging pressure pA (FIG. 1a) by means of an upstream pressure signal SV input electrically by software logic. The first armature 28.1 is assigned a first armature cross section BQ.1 in the open position, and the second armature 28.2 is assigned a second armature cross section BQ2 in the open position, it being possible for said cross sections to be identical or even different, e.g. between 1 mm and 4 mm.

The armatures 28.1, 28.2 of the double armature valve 28 in the throttle assembly 25 are opened or closed by means of the upstream pressure signal SV in accordance with the upstream pressure pV, i.e. flow of the entering pressure medium E through the respective armature 28.1, 28.2 is allowed or prevented, wherein, in the case of a low upstream pressure pV which falls below a predefined limit pressure pG, the two armatures 28.1, 28.2 are preferably connected in parallel with one another, i.e. in the state shown in FIG. 3a, both armatures 28.1, 28.2 are switched over, thus allowing the entering pressure medium E to flow through both armatures 28.1, 28.2. In the case of high upstream pressures pV which exceed the predefined limit pressure pG, only one armature 28.1, 28.2 is opened, and the other armature 28.2, 28.1 is closed. At high upstream pressures pV, a greater reduction of the inlet volume flow QE will thus take place. Depending on the upstream pressure signal SV, it is also possible for there to be a complete shutdown of the throttle valve 28, i.e. a reduction of the inlet volume flow QE to zero, in that both armatures 28.1, 28.2 are closed—as shown in FIG. 3a-thus ensuring that no charging pressure medium A can flow to the multistage compressor 4.

According to the variant shown in FIG. 3b, provision is made to connect the two armatures 28.1, 28.2 in series. In order to allow variation of the assembly cross section AQ in this case, the first armature 28.1 is bridged by a bypass line 32, wherein the bypass line 32 has a bypass cross section UQ. In this case, the first armature cross section BQ.1 is equal to the second armature cross section BQ.2, and the bypass cross section UQ is smaller than the first and the second armature cross section BQ.1, BQ.2.

If the first armature 28.1 is closed and the second armature 28.2 is open, the entering pressure medium E flows through the bypass line 32 into the second armature 28.2. Since the bypass line 32 is connected in series with the second armature 28.2, the assembly cross section AQ in this case corresponds to the smaller bypass cross section UQ, and an emerging pressure medium O with a correspondingly adapted volume flow is made available. If, instead, the first and the second armature 28.1, 28.2 are opened, the entering pressure medium E flows both through the first armature 28.1 and through the bypass line 32, which are connected in parallel with one another, and then into the second armature 28.2. The total cross section BQ.1+UQ of the bypass line 32 and the first armature 28.1 is larger than the second armature cross section BQ.2 acting in series therewith, and therefore the assembly cross section AQ corresponds to the second armature cross section BQ.2. Here too, therefore, it is possible to switch between different assembly cross sections AQ.

As an alternative, a first armature 28.1 embodied as a 3/2-way valve can be used instead of the bypass line 32 shown in FIG. 3c. In a first operating position, this armature has a first path cross section WQ.1 and, in a second operating position, has a second path cross section WQ.2, wherein the first path cross section WQ.1 is smaller than the second path cross section WQ.2 and the second path cross section WQ.2 corresponds to the second armature cross section BQ.2. The first armature cross section BQ.1 is thus determined by the operating position of the first armature 28.1. In the first operating position of the first armature 28.1, the first armature cross section BQ.1 is smaller than the second armature cross section BQ.2, with the result that the assembly cross section AQ is equal to the first armature cross section BQ.1. Otherwise, i.e. in the second operating position, the assembly cross section AQ is equal to the second path cross section WQ.2 or to the second armature cross section BQ.2. Here too, therefore, it is possible to switch between different assembly cross sections AQ.

By means of the different embodiments, it is thus possible to achieve upstream-pressure-dependent volume flow limitation to the limit volume flow QG in at least two stages in order to avoid overloading the multistage compressor 4. It is thereby possible in the closed operating mode BMc to achieve a power limitation, by means of which the energy requirement of the compressor 4 can be adapted in a variable manner. The required power consumption of the motor 7 of the compressor 4 is thus limited since a limited amount of compression work has to be performed. This can be used to optimize the multistage compressor, thus enabling optimum matching, especially of the compression volume flow QV from the second compression stage 6.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 pneumatic spring system
3.i pressure medium chambers
4 two-stage compressor
5 first compression stage
5.1 first intake chamber
5.2 first compression chamber
6 second compression stage
6.1 second intake chamber
6.2 second compression chamber
7 motor
10 intake line
11 first inlet valve
12 first outlet valve
13 intermediate volume
14 second inlet valve 15 second outlet valve
16 outlet line
17 air dryer
18 restrictor
19 reservoir line
20 pressure medium reservoir
21.i controllable valves
22a first switching valve
22b second switching valve
22c control valve
23 charging line
24 third inlet valve
25 throttle assembly
25.1 throttle inlet
25.2 throttle outlet
26 control input
27.i throttle valve (controllable)
28 throttle valve (double armature)
28.1 first armature
28.2 second armature
29 parallel circuit
30 pressure measuring unit
31 throttle valve (non-controllable)
32 bypass line
33 blowoff valve
100 atmosphere
200 vehicle
A charging pressure medium
AQ assembly cross section
BMo open operating mode
BMc closed operating mode
BQ.1, BQ.2 armature cross section
DQ.j throttle valve cross section
E entering pressure medium
L1 intake air
L2 precompressed air
L3 compressed air
L4 stored air
L5 chamber air
L6 mixed air
O outlet pressure medium (volume-flow-limited)
p1 air pressure/intake pressure
p2 intermediate pressure
p3 compression pressure
p4 reservoir pressure
pA charging pressure
pE inlet pressure
pG limit pressure
pSi closing pressure
pC control pressure
QA charging volume flow
QE inlet volume flow
QG limit volume flow
QO outlet volume flow
QV compression volume flow
SQ switching valve cross section
SV upstream pressure signal
UQ bypass cross section
WQ.1, WQ.2 path cross section

The invention claimed is:

1. A throttle assembly for a pressure control system in a vehicle, the pressure control system having a pneumatic load, the throttle assembly comprising:
at least one throttle valve,
wherein the at least one throttle valve defines an assembly cross-section of the throttle assembly,
wherein the assembly cross-section specifies a flow resistance acting on a pressure medium entering the throttle assembly,
wherein the at least one throttle valve includes at least one controllable throttle valve configured to be controlled in accordance with an upstream pressure,
wherein the assembly cross-section of the throttle assembly is configured to be set, by control of the at least one controllable throttle valve, between a fully open and fully closed cross-section in such a way that an inlet volume flow of the pressure medium entering the throttle assembly can be limited to a limit volume flow between a zero volume flow and a full volume flow in accordance with the upstream pressure, in order to set, in accordance with the upstream pressure, a power consumption of the pneumatic load in the pressure control system, and
wherein the pneumatic load is connected to the throttle assembly.

2. The throttle assembly as claimed in claim 1, wherein the throttle assembly has a parallel circuit containing the at least one throttle valve,
wherein the at least one throttle valve includes at least two throttle valves, each of the at least two throttle valves having a throttle valve cross section,
wherein at least one of the at least two throttle valves in the parallel circuit is configured to be switched to a closed position under pneumatic or electric control in accordance with the upstream pressure to allow upstream-pressure-dependent setting of the assembly cross section,
wherein the assembly cross section is obtained from a sum of those throttle valve cross sections to which an open throttle valve of the parallel circuit is assigned.

3. The throttle assembly as claimed in claim 2, wherein the at least one controllable throttle valve in the parallel circuit is assigned a closing pressure and the at least one controllable throttle valve can be switched to a closed position if the upstream pressure is greater than the closing pressure in order to reduce the assembly cross section as the upstream pressure rises.

4. The throttle assembly as claimed in claim 3, wherein a plurality of controllable throttle valves are provided in the parallel circuit and each controllable throttle valve is assigned a different closing pressure such that the controllable throttle valves can be switched successively to the closed position as the upstream pressure rises in order to reduce the assembly cross section in stages as the upstream pressure rises.

5. The throttle assembly as claimed in claim 1, wherein the at least one throttle valve is embodied as a double armature valve with a first armature and a second armature, wherein each armature is assigned an armature cross section, and
wherein the two armatures can be switched in accordance with the upstream pressure in such a way that an assembly cross section can be set in accordance with a first armature cross section of the first armature and/or in accordance with a second armature cross section of the second armature.

6. The throttle assembly as claimed in claim 5, wherein the double armature valve is configured to be controlled electrically in accordance with the upstream pressure,
wherein the armatures are configured to be, if the upstream pressure exceeds a closing pressure, switched in such a way that a smaller assembly cross section can be set than in the case where the upstream pressure falls below the closing pressure.

7. The throttle assembly as claimed in claim 5, wherein the two armatures are connected in series with one another.

8. The throttle assembly as claimed in claim 7, wherein the first armature is bridged by a bypass line,
wherein the bypass line has a bypass cross section that is smaller than the two armature cross sections,
wherein a sum of the bypass cross section and the first armature cross section corresponds at least to the second armature cross section, and
wherein the first armature is configured to be set to a closed position and the second armature is configured to be set to an open position when the upstream pressure exceeds the limit pressure to enable upstream-pressure-dependent reduction of the assembly cross section.

9. The throttle assembly as claimed in claim 7, wherein a different armature cross section is configured to be set for the two armatures, wherein, for this purpose, the first armature is embodied as a 3/2-way valve which, in a first operating position, is configured to set a first path cross section as the first armature cross section, wherein the first path cross section is smaller than the second armature cross section, and, in a second operating position, is configured to set a second path cross section as the first armature cross section, wherein the second path cross section is equal to the second armature cross section, with the result that the assembly cross section can be switched between the first path cross section and the second path cross section.

10. The throttle assembly as claimed in claim 5, wherein the two armatures are connected in parallel with one another, and wherein the two armatures are each configured to be switched into a closed position in accordance with the upstream pressure in order to reduce the assembly cross section as the upstream pressure rises.

11. The throttle assembly as claimed in claim 1, wherein the limit volume flow is configured to be specified in accordance with a power limit of the pneumatic load in order to prevent overloading of the pneumatic load.

12. The pressure control system as claimed in claim 11, wherein a pneumatically or electrically controlled switching valve is arranged in the charging line ahead of the throttle assembly in a flow direction of the charging pressure medium in order to release the charging pressure medium, wherein the switching valve has a switching valve cross section which corresponds to the assembly cross section when all the throttle valves are in the open position.

13. The throttle assembly as claimed in claim 1, wherein the throttle valves are configured to be controlled in accordance with the upstream pressure in such a way that the assembly cross section is reduced as the upstream pressure rises.

14. The throttle assembly as claimed in claim 1, wherein an upstream pressure, which characterizes a loading of the pneumatic load, can be input pneumatically or electrically to the throttle assembly via a control input, wherein, for this purpose, an inlet pressure of the pressure medium entering the throttle assembly or a compression pressure emerging from the pneumatic load can be received as the upstream pressure by the control input.

15. The throttle assembly as claimed in claim 1, wherein the throttle assembly is configured to be arranged in a pressure medium line leading to the pneumatic load in order to output a volume-flow-limited output pressure medium to the pneumatic load.

16. A pressure control system, comprising:
a multistage compressor having a first compression stage for supplying a precompressed pressure medium and a second compression stage for supplying a compressed pressure medium;
at least one pressure medium chamber, which is connected to the first or the at least second compression stage, and/or a pressure medium reservoir, connected to the first or the second compression stage configured to store the compressed pressure medium; and
a charging line that connects the pressure medium reservoir and/or the at least one pressure medium chamber to the first or the second compression stage, in order to deliver a pressure medium stored in the pressure medium reservoir or a chamber pressure medium used in the at least one pressure medium chamber as a charging pressure medium to the first or the second compression stage of the multistage compressor,
wherein the throttle assembly as claimed in claim 1 is arranged in the charging line and configured to limit a charging volume flow of the charging pressure medium to the limit volume flow, and
wherein the multistage compressor is the pneumatic load.

17. A vehicle, having a pressure control system as claimed in claim 16.

18. A throttle assembly for a pressure control system in a vehicle, the pressure control system having a pneumatic load, the throttle assembly comprising:
at least one throttle valve,
wherein the at least one throttle valve defines an assembly cross-section of the throttle assembly,
wherein the assembly cross-section specifies a flow resistance acting on a pressure medium entering the throttle assembly,
wherein the at least one throttle valve includes at least one controllable throttle valve configured to be controlled in accordance with an upstream pressure, wherein the assembly cross-section of the throttle assembly is configured to be set, by control of the at least one controllable throttle valve, between a fully open and fully closed cross-section in such a way that an inlet volume flow of the pressure medium entering the throttle assembly can be limited to a limit volume flow of a range of volume flows in accordance with the upstream pressure, in order to set, in accordance with the upstream pressure, a power consumption of the pneumatic load in the pressure control system,
wherein the pneumatic load is connected to the throttle assembly,
wherein the throttle assembly has a parallel circuit containing the at least one throttle valve,
wherein the at least one throttle valve includes at least two throttle valves, each of the at least two throttle valves having a throttle valve cross section,
wherein at least one of the at least two throttle valves in the parallel circuit is configured to be switched to a closed position under pneumatic or electric control in accordance with the upstream pressure to allow upstream-pressure-dependent setting of the assembly cross section, and
wherein the assembly cross section is obtained from a sum of those throttle valve cross sections to which an open throttle valve of the parallel circuit is assigned.

* * * * *